May 25, 1965  W. L. GOFFE  3,185,051
XEROGRAPHIC METHOD

Filed Oct. 16, 1962  3 Sheets-Sheet 1

INVENTOR.
WILLIAM L. GOFFE
BY Stanley B Cole
ATTORNEY

INVENTOR.
WILLIAM L. GOFFE
BY Stanley B Cole
ATTORNEY

INVENTOR.
WILLIAM L. GOFFE
BY
ATTORNEY

United States Patent Office 3,185,051
Patented May 25, 1965

3,185,051
XEROGRAPHIC METHOD
William L. Goffe, Rochester, N.Y., assignor to Xerox Corporation, Rochester, N.Y., a corporation of New York
Filed Oct. 16, 1962, Ser. No. 230,941
14 Claims. (Cl. 95—1.7)

This invention relates to xerography.

Xerography and its conventional forms on the market today involve relatively complex equipment for exposure and development of an image. Unlike photography, it has not been easy to maintain a xerographic member in a sensitized condition for long periods of time, expose it to an image and then store it for further long periods of time before developing the latent image. In addition, plates which exhibit high speed or are capable of multiplication effects, tend to have high dark decay rates and images and charges cannot readily be stored on such plates. Now in accordance with the present invention a xerographic method has been found which enables the formation and development of a xerographic image simultaneously without the need of a presensitized xerographic plate. Thus, it is an object of the invention to provide a method of simultaneous image formation and development by xerographic means.

It is a further object of the invention to define a method of xerographic image formation that may be performed by a compact unitary device.

It is a further object of the present invention to define a method and apparatus for the xerographic reproduction of images that does not require the extended preservation of electrical charges on a dielectric surface.

Further objects and features of the invention will become apparent while reading the following description in connection with the drawings wherein.

Figure 1:
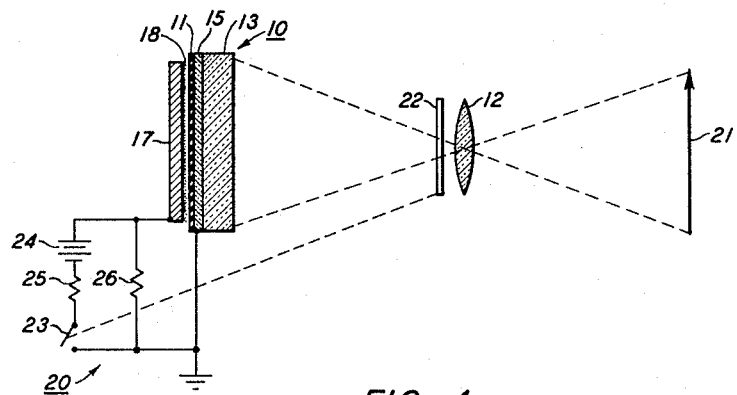
FIGURE 1 is a schematic representation of the circuity for performing the inventive process.

The method of the present invention is best understood by referring to the schematic illustration in FIGURE 1. In FIGURE 1 a xerographic plate 10 is positioned with the photoconductive insulating layer 11 of the plate in the focal plane of lens 12. The illustrated xerographic plate comprises a transparent supporting substrate 13, appropriately glass or a transparent plastic material, coated with a transparent conductive layer 15, such as tin oxide or copper iodide, which in turn is coated with a photoconductive insulating material 11 such as vitreous selenium, anthracene, sulphur other organic or inorganic photoconductive insulators, or a binder layer of photoactive material such as certain sulfides, oxides and selenides of zinc, cadmium, calcium, lead and other elements. Positioned against the rear surface of the photoconductive layer 11 is a conductive electrode 17. Electrode 17 may be brass, aluminum or any other solid metallic material or it may be plastic or other material having a conductive surface layer such as an evaporated metallic layer or bonded foil. The surface facing photoconductive layer 11 should be a smooth or polished surface. Over the surface of electrode 17 is a thin coating of fine electroscopic powder 18 such as is commonly used as xerographic toner for developing latent electrostatic images. More specifically this powder is an electrically insulating resin material containing appropriate dyes or pigments and can be of the nature of those disclosed in U.S. Patents 2,891,011 and 2,788,288. The conductive transparent layer 15 of the xerographic plate is connected to the electrode 17 by means of electrical circuit elements generally designated 20.

In the operation of the apparatus schematically illustrated in FIGURE 1, the electrode 17 is first coated with xerographic toner. Loading toner on the surface of the electrode 17 may be done by directing a powder cloud of developer material at the electrode surface. Many particles striking the surface will remain adherent and loading many be continued in this manner until a uniform and dense coating is obtained. Improved loading can be obtained if the particles are electrostatically charged prior to depositing them on the surface to be loaded as by feeding through fine tubes or the like. It has also been found valuable to bias the surface to be loaded when charged particles are used and preferably to a polarity opposite to that of the polarity of charge on the particles. One device which has been used for loading is shown in U.S. Patent 2,759,450. Other suitable toner loading techniques are disclosed in U.S. Patent 2,895,847. One such technique is cascading, cascade developer, as used in xerography, across the surface of the electrode. Liquid loading systems have also been tried, but these generally have been less successful since an electrode loaded in such a manner and dried will not readily release the toner during development unless wetted again. The preferred technique of loading, which has given the best results to this time, involves a powder cloud fed to the electrode while a bias is applied to the electrode attracting charged particles of the powder cloud for uniform deposition. It has been found preferable to obtain a rather dense coating of toner on the electrode. With a powder cloud coating process, this will not normally exceed a thickness of about one mil. It should be understood that in the normal practice of the present invention the electrodes would be precoated with the toner or developer material and that such coating processes as described above would not normally be attendant on use of the camera to form an image. The coated electrode is first positioned coated surface foremost against photosensitive surface 11 of xerographic plate 10. It is essential that a pressure or compressive contact be made between the coated surface of the electrode and photosensitive surface 11. The amount of pressure to be applied will depend on the flexibility of the electrode, the nature of the toners, and the uniformity of the toner coating. With fairly flexible electrodes and fine hard toners uniformly coated, pressure requirements are minimum. However, with increasing difficulty of obtaining uniform contact, the applied pressure must be increased to obtain good results. Generally it has been found that a range of pressures between 1 and 10 lbs. per square inch is suitable. While at some higher pressure it is probable that physical damage or undesirable pressure transfer of toner particles may take place, practical considerations made it infeasible as well as unnecessary to establish an exact upper limit. It is not believed that pressures in excess of ten pounds per square inch can be utilized with any advantage over the lower pressures and this is deemed to be the approximate upper limit for practical embodiments of the invention. The apparatus is aimed so that lens 12 focusses illuminated subject 21 and shutter 22 is actuated to permit a pattern of light and shadow from subject 21 to be focused upon photosensitive layer 11. Switch 23 synchronized with the actuation of the shutter is closed simultaneously with the opening of the shutter to supply an electrical pulse between electrode 17 and transparent conductive layer 15. The purpose of the electrical circuit components 20 is to apply a direct current electrical pulse between about 300 and 1000 volts across electrode 17 and conductive layer 15. The time duration of this pulse is not particularly critical and for optimum results will vary somewhat according to the voltage applied, the amount of exposure and the characteristics of the photosensitive materials. However, it has been found generally preferable that the pulse be limited to no more than ½ second while pulses as short as 1/60 second have been used satisfactorily.

It is readily understod that any D.C. pulse generating device may be quite suitably applied for the purposes of this invention; however, a circuit for that purpose is included for completeness of description and can help illustrate the simplicity of the apparatus required to perform the inventive method. Essentially the circuit includes a battery 24 connected in series with a single pole switch 23 between the conductive layer and the electrode. The switch 23 is suitably of the nature commonly found associated with the lense of a conventional photographic camera for flash synchronization purposes. In this instance the switch is connected so that it closes with the actuation of the shutter and opens again at the end of the timing interval set by the shutter mechanism thus applying a pulsed voltage across the electrode and conductive layer. In the circuit illustrated resistor 25 serves a load protection function so that if a short circuit should accidentally occur as between electrode 17 and transparent conductive layer 15, it would not place a direct short across battery 24. A second resistor 26 is connected between electrode 17 and the conductive layer 15 to leak off charge causing residual potential between the two after pulsing. This has the advantage, for example, of reducing the tendency for arcing when the electrode is removed from the xerographic plate. Such arcing, if not avoided, causes some disturbances of the image.

While it is not certain that the operation of the inventive process is fully understood at this time, laboratory experimentation has offered one likely explanation. Assuming that the toner has a slight positive charge it will be repelled by whichever of the electrode or plate is positively pulsed and will be attracted to the other. This action will be relatively stronger in areas where the photoconductive insulator is illuminated. A rather weak image is formed at this point. With further exposure and pulse application there appears to occur a charge migration to the toner. The amount of charge migration in a given discrete area is proportional to the amount of illumination in that area. This migration occurs either from the electrode or the xerographic plate depending on the polarity of the direct current pulse and the charge preference of the toner. This charge migration then controls the toner movement since the affinity of individual toner particles for one surface or the other is determined largely by the final charge on the toner. Considerable contrast enhancement also occurs in the image formed after some charge migration relative to an image formed before enough exposure and voltage has been applied to produce such migration.

When the xerographic plate is exposed and the direct current pulse is applied simultaneously it is not necessary or even desirable that the plate have the charge storage characteristics usually required for conventional xerographic use. Plates, having a high dark decay are operative with the present invention. One plate tested was comprised of a glass substrate coated with a transparent tin oxide over which was deposited a 0.1 micron film of selenium-tellurium. Over the selenium-tellurium film, a vitreous selenium film of 50 microns was coated. This plate charged to negative 200 volts exhibited 70% half-minute dark decay. The dark decay in this plate is far in excess of the limitations for conventional xerography, but in the present inventive process, this plate produced a good image and showed a sensitivity of 5 to 10 times greater than for a normal selenium plate when an incandescent light source was used.

The inventive method does not have to operate with simultaneous electrical pulsing and exposure. Satisfactory images were obtained by leaving the light on continuously and pulsing the voltage, for the same interval as previously described, up to about one-half second. This means that in some cases the shutter and switch synchronization can be eliminated retaining only a timed switch to provide the electrical pulse. It is also possible in accordance with the invention to utilize what has been called the "Kallmann Effect" in which the photoconductor is first exposed to the subject to be reproduced and then, after termination of the exposure, light fatigue effects in the photoconductor produce a latent conductivity so that when the electrical pulse is applied, within a short time after the exposure, an image will be formed in a similar fashion to when the exposure and electrical pulsing are concurrent.

Figure 2:
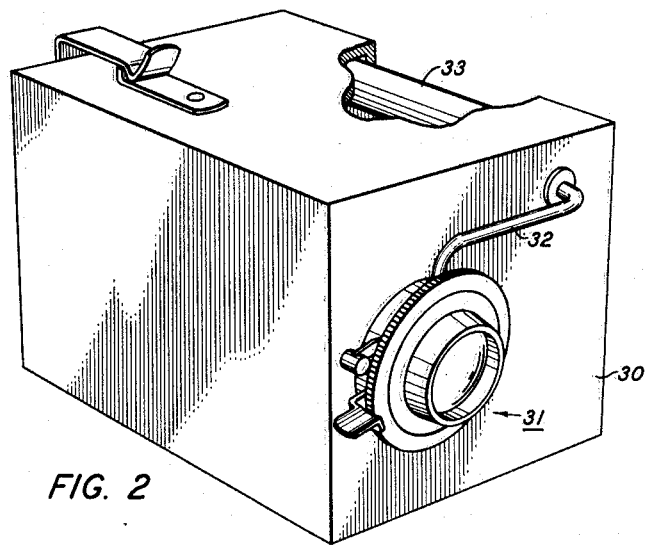
FIGURE 2 is a front isometric view of camera apparatus according to the invention.
Figure 3:
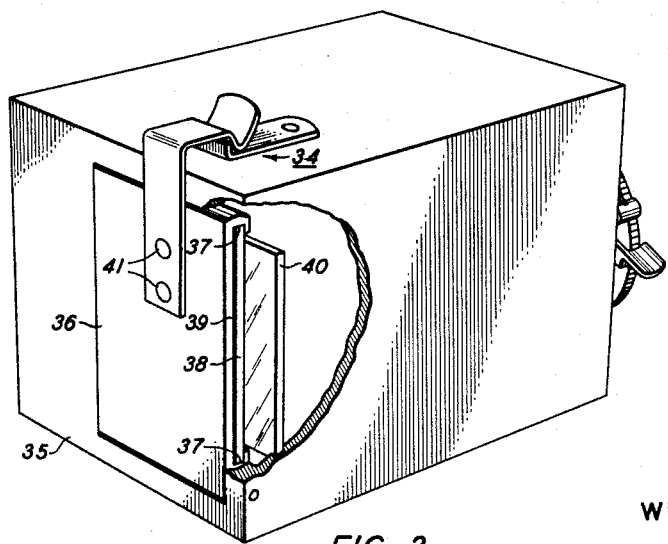
FIGURE 3 is a rear isometric view of a camera apparatus in accordance with the invention.

The present invention has a particular value in its ready adaptability to a small hand-held camera device. Such a device is illustrated in FIGS. 2 and 3. As illustrated in FIG. 2, front panel 30 conventionally includes combined lens and shutter mechanism 31 with electrical synchronizing connections 32 to electrical circuit elements including battery 33 which is illustrated as being contained inside the camera housing but which in some commercial designs may be just as appropriately housed outside the camera housing.

Referring now to FIG. 3, the rear panel 35 of the camera housing is shown to include a pivotal backing member 36, which in its closed position is held firmly under tension by spring clip locking means 34. Backing member 36 includes slots 37 adapted for holding conductive electrode 38 which may be readily removed from the backing member as by sliding it out of the slots. Xerographic plate 40, similar to that illustrated in FIG. 1 as plate 10, is mounted in a fixed position in the camera housing in a plane parallel to the back of the housing and with its transparent supporting substrate facing the camera lens. Plate 40 and backing member 36 are so mounted and positioned that, when the backing member is closed and locked, electrode 38 is forced into compressive contact with the xerographic plate. To enable this contact to be as uniform as possible it has been found preferable to bond a layer of resilient or rubber-like material 39 to backing member 36 behind the slots for holding electrode 38. This enables some flexing in the position of electrode 38 permitting increased uniformity in contact with the xerographic plate. A still further improvement has been found possible by using a thin electrode having some flexibility. Electrical connections such as illustrated in the schematic drawing FIG. 1 are not readily shown in the illustrated embodiment of FIGS. 2 and 3 due to the housing of the camera. However, the connections have the same electrical continuity shown in FIG. 1 including a wire going from the battery 33 internally of the camera housing to spring lock 34 where the conductive contact of the metal lock provides electrical continuity to the backing member where fastenings 41 through the backing member are connected inside the back member to a metallic spring contact engaging electrode 38. The conductive layer of xerographic plate 40 is connected inside the housing in a conventional manner in accordance with the schematic diagram in FIG. 1.

In a further embodiment of a camera apparatus in accordance with the invention, it is possible to eliminate the lens shutter, operate the camera without mechanical timing or other precision mechanical devices and even view the subject as it is focussed on the sensitive surface during picture-taking. A camera for this purpose is diagrammatically illustrated in FIGURE 4. Referring to the figure the camera comprises generally a housing 45, lens 46, xerographic plate 47, spring snaps 48 for maintaining the back cover under pressure contact with plate 47, and a viewing system comprising mirrors 50 and 51 and a viewing window 52. Additionally, the camera includes a battery 53, a pulsing circuit 55 and switches 56 and 57 for timing and applying the electrical pulses, these elements being illustrated in more detail in FIGURE 5.

For operation with this camera, so that the image may be viewed on the photoreceptor plate 47 must have somewhat light diffusing characteristics at the interface of the transparent conductive layer and the photoconductive insulating layer. For this purpose photoconductor binder materials such as zinc oxide particles in an insulating resin binder have proved suitable. The object image focussed through lens 46 is partially diffusely reflected by the photosensitive layer, back onto mirror 50, up to mirror 51 and out to the viewer. The electrical pulse of a duration selected by switch 56 is applied by actuation of switch 57 and the developed image is formed while the subject is viewed as actually focussed on the xerographic plate. With the above embodiment it is preferable to use low fatigue plates. However, if the lense is normally shielded as by a dust cover and viewing window 52 is likewise shielded from incidental light, fatigue effects are less objectionable.

It is, of course, also possible to use a more conventional reflex arrangement for viewing with a mirror facing the lens which may be selectively positioned out of the focal path when the plate-electrode assembly is pulsed. This reflex arrangement can be of the type used for viewing in conventional single lens reflex cameras with the exception that it doesn't require mechanical cooperation with a precision shutter mechanism. It is advantageous with the interposed-mirror-reflex viewing to design the mirror actuating assembly so that the pulse switch is actuated by the mirror reaching fully retracted position. It will be noted that with conventional interposed-mirror-reflex the subject is viewed directly through the lens and not as it appears diffusely reflected at the sensitive layer interface.

Figure 5:
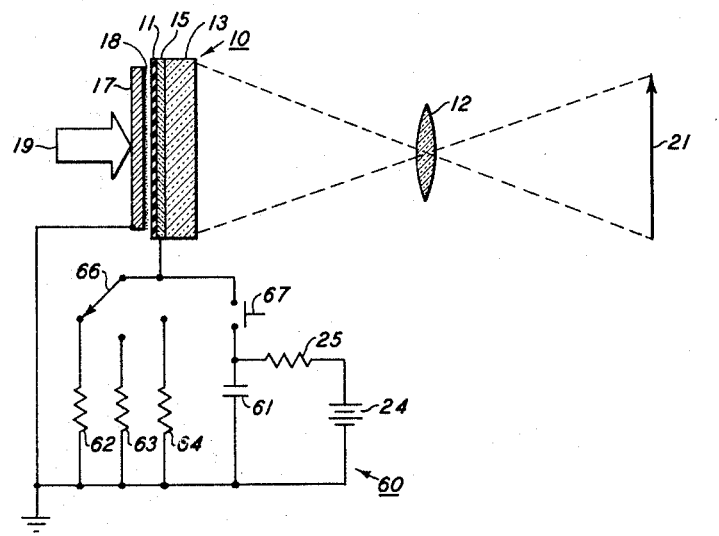
FIGURE 5 is a schematic representation of the circuitry of the apparatus of FIGURE 4.
Figure 4:
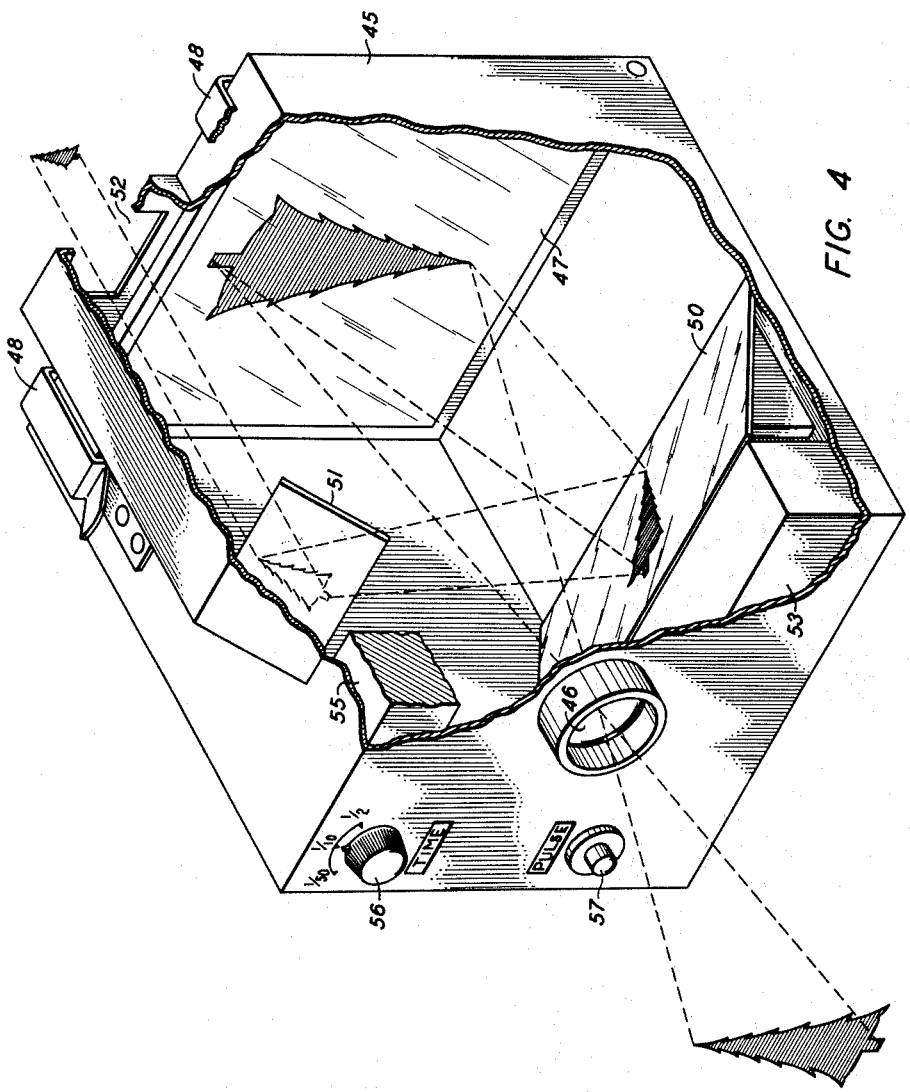
FIGURE 4 is an isometric view of a second embodiment of camera apparatus in accordance with the invention.

An embodiment of the invention as used in the camera apparatus of FIGURE 4, is schematically represented in FIGURE 5. When using a shutterless camera as that of FIGURE 4, the present invention also avoids all of the usual precision mechanical timing devices with their inherent wear and deterioration problems. As illustrated in FIGURE 5, simple capacitor-resistor timing circuits are operable to perform the necessary pulse timing functions.

Referring to FIGURE 5 wherein the like numerals designate items essentially identical with those in FIGURE 1. Xerographic plate 10 comprises a transparent support layer 13, a transparent conductive layer 15 and an insulating photoconductive layer 11. A toned electrode 17 is positioned against layer 11 with sufficient pressure 19 (indicated symbolically by an arrow) to uniformly compress the toner layer 18.

An electrical pulsing circuit 60 is illustrated as supplying a positive polarity pulse. This polarity is not critical and the opposite polarity as illustrated in FIGURE 1 is equally operable. Circuit 60 comprises a voltage source 24 for charging capacitor 61, isolating resistor 25 for protecting the voltage source from short circuits and maintaining the charging current at a reasonable level, pulse timing resistors 62, 63, and 64, pulse timing switch 66 and pulse switch 67.

In operation, source 24 charges capacitor 61 through resistor 25 to the source voltage of about 350 to 1000 volts and, for example, to about 500 volts. On actuation of the pulse switch 67, capacitor 61 applies the full voltage across the plate and electrode assembly. Capacitor 61 commences discharging through the plate and electrode assembly and through the resistor selected by switch 66. The resistance-capacitance time constants are chosen to hold the pulse within the operative voltage range for the desired pulse interval. For example, with a 500 volt source, the pulse interval will be from actuation of switch 67 until the charge on capacitor 61 has decayed to about 300 volts.

By way of explanation, exemplary circuit details may be given as follows: With a one square inch xerographic plate of an insulating photoconductor having total resistivity in the light of higher than 10 megohms and an isolating resistor 25 with a resistance of about 5 megohms, the capacitance resistance time constants will be primarily dependent on capacitor 61 and the selected resistor 62, 63, or 64. The current through the plate and the continued charging current through resistor 25 will be negligible. With capacitor 61 having a value of 1 microfarad and resistor 62 having a resistance of 40,000 ohms, the 500 volt charge on capacitor 61 will drop to 300 volts in about $\frac{1}{50}$ of a second. This is ½ RC time for these values and will drop the voltage by nearly 40%. Values for resistors 63 and 64 of 200,000 ohms and 1 megohm respectively will give ½ RC time constants of about $\frac{1}{10}$ sec. and ½ sec. respectively. Thus, these values are suitable provided currents through resistor 25 and the plate-electrode assembly are small enough as to be negligible. Switch 67 is preferably of a latching type such as maintains contact until a second actuation releases it; otherwise, it would be necessary to hold it for a time at least as long as the pulse duration. After pulsing, the selected resistor 62, 63, or 64 bleeds off any charge remaining on the plate as does resistor 26 in FIGURE 1.

While it is apparent that these currents may conveniently be made nearly equal and self-cancelling by choosing a proper resistor 25, the variation in plate current during pulsing is nonlinear and difference in illumination from one exposure to the next introduces further errors. Thus it is desirable to select capacitor 61 and resistors 62, 63, and 64 so that a relatively high current flows through the resistor selected by switch 66 as compared with other current to assure precise control of the effective pulse duration.

With these cameras as described, a picture may be taken and then, when the backing member 36 is snapped open, a developed image is available which is readily transferred by use of a transfer sheet carrying an adhesive coating. Such a transfer can be made from either the electrode or the selenium plate depending upon whether a positive or negative reproduction is desired. If the transfer sheet is transparent, the reproduction may be viewed from either side and may be utilized as a projection slide. When an adhesive transfer as described above is used, it has been found desirable to either place a second transparent adhesive sheet over the image to both protect the image and cover the remaining adhesive areas or else to dust the transfer sheet having the image on it with a powder of contrasting color to cover the remaining adhesive and at the same time enhance the image contrast. For example, if a black or other colored toner is used, a white pigmented powder will cover remaining adhesive areas and produce greater contrast. Although an adhesive transfer has been found preferable due to the completeness of the transfer, other transfer procedures known to the xerographic art such as electrostatic transfer can be used.

While the present invention has been described as carried out in specific embodiments thereof, there is no desire to be limited thereby, but it is intended to cover the invention broadly within the spirit and scope of the appended claims.

What is claimed is:

1. Apparatus for xerographic image formation comprising:
    (a) means to position a conductive electrode coated with an electroscopic pigmented particulate material in compressive contact against the photoconductive insulating surface of a xerographic plate comprising a transparent supporting substrate coated with a transparent conductive layer which in turn is coated with a photoconductive insulating layer of vitreous selenium,
    (b) means to expose said plate to an image pattern to be reproduced, and
    (c) means to apply a direct current voltage pulse between said electrode and said plate simultaneously with exposure.

2. Camera apparatus for image formation by simultaneous exposure and development comprising:
   (a) an imaging member comprising a conductive electrode having a surface coated uniformly with electroscopic insulating resin toner,
   (b) means to position the coated surface of said electrode against the photoconductive insulating surface of a xerographic plate having a transparent supporting substrate,
   (c) means to compress said resin toner uniformly between said electrode and said plate with a pressure of about 1 to 10 lbs. per square inch,
   (d) means to expose said plate through said substrate to an image pattern of light and shadow, and
   (e) means to apply a direct current voltage pulse between said electrode and said plate concurrently with exposure.

3. Camera apparatus for image formation according to claim 2 in which said means to apply a direct current voltage pulse includes a voltage source having an output potential of about 300 to 1000 volts.

4. Camera apparatus for image formation according to claim 3 in which said means to apply a direct current voltage pulse includes pulse timing means to provide a pulse having a duration of about $\frac{1}{60}$ to $\frac{1}{2}$ second.

5. A method of xerographic image forming comprising:
   (a) positioning a conductive electrode coated with an electroscopic pigmented particulate material in compressive contact with a contacting pressure of 1 to 10 lbs. per square inch against the photoconductive insulating surface of a xerographic plate having a transparent supporting substrate,
   (b) exposing said plate to an image pattern to be reproduced,
   (c) simultaneously with said exposing, applying a direct current voltage pulse between said electrode and said plate,
   (d) separating said electrode and said plate, and
   (e) adhesively removing the image from one of said plate and said electrode to an adhesive coated transfer sheet.

6. A method of xerographic image forming according to claim 5 in which said adhesive coated transfer sheet is transparent.

7. A method of image formation by simultaneous exposure and development comprising:
   (a) coating a conductive electrode with particulate pigmented electroscopic material,
   (b) positioning the coated surface of said electrode in compressive contact against the photoconductive insulating surface of a xerographic plate having a transparent supporting substrate,
   (c) exposing said plate through said substrate to an image pattern of light and shadow,
   (d) concurrent with said exposing, applying a direct current voltage pulse between said electrode and said plate,
   (e) separating said electrode and said plate,
   (f) adhesively removing the image from said plate and said electrode to an adhesively coated transfer sheet, and
   (g) dusting said transfer sheet with a powder having contrasting pigmentation to that in said electroscopic material.

8. A method of taking a picture xerographically with a noncritical exposure comprising:
   (a) positioning an electrically conductive layer coated with xerographic toner coated surface foremost in compressive contact against the photoconductive surface of a zerographic plate having a transparent supporting substrate,
   (b) exposing said plate through said substrate to an image pattern of light and shadow for an indeterminate interval of time,
   (c) during said interval of time, applying a direct current voltage pulse of about 300 to 1000 volts with a pulse length of about $\frac{1}{60}$ to $\frac{1}{2}$ second across said conductive layer and said plate, and
   (d) separating said conductive layer and said plate.

9. A method of taking a picture xerographically with a noncritical exposure comprising:
   (a) positioning an electrically conductive layer coated with xerographic toner coated surface foremost in compressive contact against the photoconductive surface of a xerographic plate having a transparent supporting substrate,
   (b) exposing said plate through said substrate to an image pattern of light and shadow for an indeterminate interval of time,
   (c) terminating said exposing,
   (d) immediately after termination of said exposing applying a direct current voltage pulse between said conductive layer and said plate,
   (e) separating said conductive layer and said plate, and
   (f) adhesively removing the image from at least one of said conductive layer and said plate to an adhesive coated transfer sheet.

10. Apparatus for forming an image xerographically comprising:
    (a) means including an electrically conductive layer having a stratum of electroscopic pigmented particulate material on a surface thereof and a photoconductive layer in face to face relationship with said surface,
    (b) means to compress said stratum of electroscopic pigmented particulate material between said electrically conductive layer and photoconductive layer,
    (c) means to expose said photoconductive layer to an image pattern to be reproduced,
    (d) means to apply a direct current voltage pulse between said conductive layer and a transparent conductive coating on the non-adjacent side of said photoconductive layer simultaneously with exposure, and
    (e) means to remove residual electric potential across said conductive layer and said photoconductive layer after the termination of said exposing and said applying a direct current voltage pulse by an electrically resistive connection between said conductive layer and said transparent conductive coating.

11. A xerographic camera comprising:
    (a) a camera housing having a front and a back,
    (b) a camera lens and shutter system mounted in said front, including a synchronized electrical switch,
    (c) a xerographic plate, comprising a transparent support layer, a transparent electrode upon said support layer and a photoconductive insulator coated over said electrode, mounted with said support layer facing said lens and shutter system and said photoconductive insulator in the focal plane of said lens,
    (d) means to removably mount a second electrode on said back,
    (e) spring pressure means for forcing an electrode mounted on said back into pressure contact of 1 to 10 lbs. per square inch with said xerographic plate,
    (f) battery mounting means internally of said housing, and,
    (g) means to conductively connect an electrode mounted on said back in series with a battery in said battery mounting means and with said electrical switch to said transparent electrode.

12. Xerographic camera apparatus with provision for viewing the subject image on the photoreceptor during image formation comprising:
    (a) a camera housing, (b) a shutterless lens, (c) a xerographic plate having a transparent supporting substrate facing said lens and a photoconductive dielectric layer in the focal plane of said lens, (d) a system of mirrors for receiving a partially diffusely reflected image from said plate and transmitting to a viewing window without obstructing the focal path from said lens to said plate, (e) means to position a conductive electrode uniformly coated with an insulating electroscopic particulate coating against said dielectric layer, (f) means to apply a compressive pressure of about 1 to 10 lbs. per square inch between said electrode and said dielectric layer to compress said particulate coating, and (g) electrical circuit means to apply a direct current voltage of between about 1000 and 300 volts across said dielectric layer and said particulate coating for a predetermined time interval.

13. Xerographic camera appartus according to claim 12 in which said electrical circuit means comprises capacitor-resistor networks for determining said time intervals in accordance with RC time constants.

14. Apparatus according to claim 1 in which said means to apply a direct current voltage pulse comprises:

(a) a voltage source, (b) a capacitor adapted to be charged from said voltage source, (c) a plurality of different valued resistors selectable to form RC networks with said capacitor to provide a discharge voltage from said capacitor remaining between predetermined limits for a selected length of time, (d) first switch means for selecting said resistor, and (e) second latching switch means for applying the charge voltage on said capacitor to a xerographic imaging assembly.

References Cited by the Examiner
UNITED STATES PATENTS

| | | | |
|---|---|---|---|
| 2,358,891 | 9/44 | Towner | 307—132 |
| 2,814,739 | 11/57 | Cline | 307—132 |
| 2,909,971 | 10/59 | Barber | 95—1.7 |
| 2,931,923 | 4/60 | Cegan | 307—132 |
| 2,946,682 | 7/60 | Lauriello | 96—1 |
| 2,947,625 | 8/60 | Bertelsen | 96—1 |
| 2,968,553 | 1/61 | Gundlach | 96—1 |
| 2,984,163 | 5/61 | Giaimo | 95—1.7 |
| 3,058,010 | 10/62 | Rockafellow | 307—132 |
| 3,062,110 | 11/62 | Shepardson et al. | 95—1.7 |

EVON C. BLUNK, *Primary Examiner.*

NORMAN G. TORCHIN, *Examiner.*